United States Patent
Endo

(10) Patent No.: US 7,608,667 B2
(45) Date of Patent: Oct. 27, 2009

(54) RUBBER COMPOSITION AND TIRE USING THE SAME

(75) Inventor: Noriko Endo, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 477 days.

(21) Appl. No.: 11/275,860

(22) Filed: Feb. 1, 2006

(65) Prior Publication Data

US 2006/0173134 A1    Aug. 3, 2006

(30) Foreign Application Priority Data

Feb. 3, 2005  (JP) .............................. 2005-027482

(51) Int. Cl.
   C08L 9/00    (2006.01)
   C08L 25/02   (2006.01)

(52) U.S. Cl. ..................................... 525/232; 525/241

(58) Field of Classification Search ................ 525/232, 525/241
   See application file for complete search history.

(56) References Cited

U.S. PATENT DOCUMENTS 6,458,893 B1 * 10/2002 Tasaka et al. ............... 525/222
7,211,630 B2 *  5/2007 Masaki et .................. 525/237

FOREIGN PATENT DOCUMENTS

| DE | 3434973 A1 | 4/1986 |
| EP | 1 514 901 A1 | 3/2005 |
| JP | 2000-129037 A | 5/2000 |
| JP | 2003-253051 A | 9/2003 |

* cited by examiner

Primary Examiner—Nathan M Nutter
(74) Attorney, Agent, or Firm—Sughrue Mion, PLLC

(57) ABSTRACT

A rubber composition comprises as a rubber component (A) an aromatic vinyl compound-conjugated diene compound copolymer polymerized with a lithium-based polymerization initiator and having a polystyrene-conversion weight average molecular weight of $3.0 \times 10^5 - 3.0 \times 10^6$ as measured by a gel permeation chromatography and (B) 10-200 parts by mass, based on 100 parts by mass of the copolymer (A), of a hydrogenated styrene-butadiene copolymer having a polystyrene-conversion weight average molecular weight of $5.0 \times 10^3 - 2.0 \times 10^5$ as measured by a gel permeation chromatography and a bound styrene content of 10-70 mass % in which 25-50% of double bonds in butadiene portion is hydrogenated.

8 Claims, No Drawings

RUBBER COMPOSITION AND TIRE USING THE SAME

BACKGROUND OF THE INVENTION

1. Field of the Invention

This invention relates to a rubber composition and a pneumatic tire using such a rubber composition as a tread rubber, and more particularly to a rubber composition capable of using as a tread rubber to highly balance the steering stability, wear resistance and fracture properties of a tire.

2. Related Art

With the advance of high power performance of recent vehicles comes the demand better steering stability, particularly a tire having excellent steering stability on a dry road surface. On the other hand, it is important to sufficiently ensure the wear resistance and fracture properties of the tire from a viewpoint of economical efficiency and safety. In this regard, various techniques have been developed for improving the steering stability of the tire. In general, it is known that a loss characteristic above room temperature (tan δ) is an important indicator for developing the rubber composition for the steering stability of the tire. In order to improve the steering stability of the tire, it is effective to increase a hysteresis loss above room temperature of the rubber composition used as the tread rubber of the tire.

As the technique of increasing the hysteresis loss of the rubber composition, a method of using a liquid polymer having a weight average molecular weight of several tens of thousands is known (see JP-A-61-203145 and JP-A-63-101440). However, the liquid polymer has a problem that, although the weight average molecular weight is as low as tens of thousands, the amount of double bonds having a crosslinking property is large, and thus, a part of the liquid polymer is incorporated into a matrix rubber by crosslinking with the matrix. Hence, sufficient hysteresis loss is not developed.

On the contrary, a method to increase hysteresis loss of the rubber composition is proposed wherein the double bond in the liquid polymer is saturated by hydrogenation so as not to be incorporated into the matrix by crosslinking of the liquid polymer. In this case, there is a problem that as the hydrogenating ratio of the double bonds in the liquid polymer becomes too high, the compatibility of the hydrogenated polymer with the matrix rubber can not be ensured and hence the fracture properties of the rubber composition lower.

SUMMARY OF THE INVENTION

It is, therefore, an object of the invention to solve the aforementioned problems of the conventional techniques and to provide a rubber composition capable of being used as a tread rubber of a tire to improve the steering stability and wear resistance without lowering the fracture properties of the tire. Also, it is another object of the invention to provide a pneumatic tire having highly balanced steering stability, wear resistance and fracture properties by using such a rubber composition as a tread rubber.

The inventor has made various studies in order to achieve the above objects and found that the steering stability and wear resistance of the tire can be improved without lowering the fracture properties by using as a tread rubber of the tire, a rubber composition comprising as a rubber component (A) an aromatic vinyl compound-conjugated diene compound copolymer having a specified molecular weight, and (B) a properly hydrogenated styrene-butadiene copolymer having specified molecular weight and bound styrene content, and as a result, the invention has been accomplished.

According to the invention, there is provided a rubber composition comprising as a rubber component (A) an aromatic vinyl compound-conjugated diene compound copolymer polymerized with a lithium-based polymerization initiator and having a polystyrene-conversion weight average molecular weight of $3.0 \times 10^5$–$3.0 \times 10^6$ as measured by a gel permeation chromatography and (B) 10-200 parts by mass, based on 100 parts by mass of the copolymer (A), of a hydrogenated styrene-butadiene copolymer having a polystyrene-conversion weight average molecular weight of $5.0 \times 10^3$–$2.0 \times 10^5$ as measured by a gel permeation chromatography and a bound styrene content of 10-70 mass % in which 25-50% of double bonds in butadiene portion is hydrogenated.

In a preferable embodiment of the rubber composition according to the invention, the aromatic vinyl compound-conjugated diene compound copolymer (A) is a styrene-butadiene copolymer. In this case, the bound styrene content of the aromatic vinyl compound-conjugated diene compound copolymer (A) is preferably in a range of 20-40 mass %, which can improve the wear resistance while ensuring the fracture properties of the rubber composition. Also, the vinyl bond content in the butadiene portion of the aromatic vinyl compound-conjugated diene compound copolymer (A) is preferable to a range of 30-60%, which can sufficiently improve the steering stability and wear resistance of the tire because the wet-skid resistance and wear resistance of the rubber composition are high.

In the rubber composition according to the invention, it is preferable that 35-50% of double bonds in the butadiene portion of the hydrogenated styrene-butadiene copolymer (B) are hydrogenated. In this case, the hysteresis loss of the rubber composition is very high, and hence the steering stability of the tire can be largely improved.

In another preferable embodiment of the rubber composition according to the invention, the bound styrene content of the hydrogenated styrene-butadiene copolymer (B) is 10-60 mass %. In this case, the wet-skid resistance and dry gripping property of the rubber composition are high, and hence the steering stability of the tire can be sufficiently improved.

In the rubber composition according to the invention, it is preferable to compound the hydrogenated styrene-butadiene copolymer (B) in an amount of 20-100 parts by mass based on 100 parts by mass of the aromatic vinyl compound-conjugated diene compound copolymer (A). In this case, the steering stability and wear resistance of the tire can be sufficiently improved while sufficiently ensuring the productivity of the rubber composition.

Further, the invention is a pneumatic tire characterized by using the above rubber composition as a tread rubber.

According to the invention, there can be provided a rubber composition capable of improving the steering stability and wear resistance of a tire without lowering the fracture properties by using (A) an aromatic vinyl compound-conjugated diene compound copolymer having a specified molecular weight and (B) a properly hydrogenated styrene-butadiene copolymer having specified molecular weight and bound styrene content as a rubber component in a tread rubber of the tire. Also, there can be provided a pneumatic tire having highly balanced steering stability, wear resistance and fracture properties by using such a rubber composition as a tread rubber.

BEST MODE FOR CARRYING OUT THE INVENTION

The invention will be described in detail below. The rubber composition of the invention comprises as a rubber component (A) an aromatic vinyl compound-conjugated diene compound copolymer polymerized with a lithium-based polymerization initiator and having a polystyrene-conversion weight average molecular weight of $3.0 \times 10^5 - 3.0 \times 10^6$ as measured by a gel permeation chromatography and (B) 10-200 parts by mass, based on 100 parts by mass of the copolymer (A), of a hydrogenated styrene-butadiene copolymer having a polystyrene-conversion weight average molecular weight of $5.0 \times 10^3 - 2.0 \times 10^5$ as measured by a gel permeation chromatography and a bound styrene content of 10-70 mass % in which 25-50% of double bonds in butadiene portion is hydrogenated.

Since the rubber composition of the invention contains the hydrogenated styrene-butadiene copolymer (B) having a weight average molecular weight of $5.0 \times 10^3 - 2.0 \times 10^5$ as a rubber component, the hysteresis loss above room temperature (tan $\delta$) is improved. Also, the hydrogenating ratio of double bonds in the butadiene portion of the hydrogenated styrene-butadiene copolymer (B) is 25-50%, so that the compatibility with the aromatic vinyl compound-conjugated diene compound copolymer (A) is excellent. As a result, the rubber composition containing the hydrogenated styrene-butadiene copolymer (B) according to the invention can sufficiently maintain the fracture properties and is excellent in the wear resistance. Therefore, by using the rubber composition of the invention as a tread rubber of a pneumatic tire, the steering stability and wear resistance (economical efficiency) of the tire can be improved while maintaining the fracture properties (safety). Also, the rubber composition of the invention can be preferably applied to belts or various industrial rubber articles.

As the rubber component in the rubber composition of the invention the aromatic vinyl compound-conjugated diene compound copolymer (A) and the hydrogenated styrene-butadiene copolymer (B) are essential and further natural rubber (NR) and/or other synthetic rubber may be included. As the other synthetic rubber polyisoprene rubber (IR), polybutadiene rubber (BR), butyl rubber (IIR), ethylene-propylene copolymer, styrene-butadiene copolymer rubber (SBR) other than the copolymer (A), and so on are mentioned. Furthermore, a rubber obtained by modifying a part of the rubber component with a polyfunctional modifying agent such as tin tetrachloride or the like and having a branched structure may be blended. In this case, the content of the rubber other than the aromatic vinyl compound-conjugated diene compound copolymer (A) and the hydrogenated styrene-butadiene copolymer (B) is preferably not more than 60 mass % of the total rubber component.

The aromatic vinyl compound-conjugated diene compound copolymer (A) used in the rubber composition of the invention is required to have a polystyrene-conversion weight average molecular weight of $3.0 \times 10^5 - 3.0 \times 10^6$ as measured by a gel permeation chromatography, more preferably $7.0 \times 10^5 - 2.5 \times 10^6$. When the polystyrene-conversion weight average molecular weight of the copolymer (A) is less than $3.0 \times 10^5$, the fracture properties of the rubber composition lower, while when it exceeds $3.0 \times 10^6$, the viscosity of the polymer solution is too high and the productivity lowers.

The aromatic vinyl compound-conjugated diene compound copolymer (A) is produced by copolymerizing an aromatic vinyl compound and a conjugated diene compound with a lithium-based polymerization initiator. As the aromatic vinyl compound are mentioned styrene, $\alpha$-methylstyrene, 1-vinylnaphthalene, 3-vinyltoluene, ethylvinyl benzene, divinyl benzene, 4-cyclohexyl styrene, 2,4,6-trimethyl styrene and the like. These aromatic vinyl compounds may be used alone or in a combination of two or more. As the conjugated diene compound are mentioned 1,3-butadiene, isoprene, 1,3-pentadiene, 2,3-dimethyl butadiene, 2-phenyl-1,3-butadiene, 1,3-hexadiene and the like. These conjugated diene compounds may be used alone or in a combination of two or more. Styrene is particularly preferable among the aromatic vinyl compounds, and 1,3-butadiene is particularly preferable among the conjugated diene compounds. Therefore, styrene-butadiene copolymer (SBR) is particularly preferable as the aromatic vinyl compound-conjugated diene compound copolymer (A).

When the aromatic vinyl compound as a starting material of the aromatic vinyl compound-conjugated diene compound copolymer (A) is styrene, the copolymer (A) is preferable to have a bound styrene content of 20-40 mass %. When the bound styrene content of the copolymer (A) is less than 20 mass %, the fracture properties of the rubber composition lower, while when it exceeds 40 mass %, the wear resistance of the rubber composition lowers.

When the conjugated diene compound as a starting material of the aromatic vinyl compound-conjugated diene compound copolymer (A) is 1,3-butadiene, the copolymer (A) is preferable to have a vinyl bond content in butadiene portion of 30-60%. When the vinyl bond content in butadiene portion of the copolymer (A) is less than 30%, the wet-skid resistance of the rubber composition is insufficient and the steering stability of the tire can not be sufficiently improved, while when it exceeds 60%, the wear resistance of the tire lowers.

On the other hand, the hydrogenated styrene-butadiene copolymer (B) used in the rubber composition of the invention is necessary to have a polystyrene-conversion average molecular weight of $5.0 \times 10^3 - 2.0 \times 10^5$ as measured by a gel permeation chromatography. When the polystyrene-conversion average molecular weight of the copolymer (B) is less than $5.0 \times 10^3$, the fracture properties, wear resistance, wet-skid resistance and dry gripping property of the rubber composition are insufficient, and hence the fracture properties, wear resistance and steering stability of the tire can not be highly balanced, while when it exceeds $2.0 \times 10^5$, the wet-skid resistance and dry gripping property of the rubber composition are insufficient, and hence the steering stability of the tire can not be improved.

Also, the hydrogenated styrene-butadiene copolymer (B) is necessary to have a bound styrene content of 10-70 mass %, more preferably 10-60 mass %. When the bound styrene content of the copolymer (B) is less than 10 mass %, the wet-skid resistance and dry gripping property of the rubber composition are insufficient, and hence the steering stability of the tire can not be improved, while when it exceeds 70 mass %, the copolymer is rendered into a resin and the rubber composition becomes rigid to lower the wet-skid resistance and dry gripping property, and hence the steering stability of the tire can not be improved.

Further, in the hydrogenated styrene-butadiene copolymer (B), it is required that 25-50% of double bonds in the butadiene portion is hydrogenated. When the hydrogenation ratio of the double bonds in the butadiene portion of the copolymer (B) is less than 25%, the improving width of the hysteresis loss in the rubber composition is small and the steering stability of the tire can not be improved, while when it exceeds 50%, the compatibility with the aromatic vinyl compound-conjugated diene compound copolymer (A) lowers and the fracture properties of the rubber composition lowers. From a viewpoint of sufficiently improving the hysteresis loss of the rubber composition, the hydrogenation ratio of double bonds in the butadiene portion of the copolymer (B) is preferably in a range of 35-50%.

In the rubber composition of the invention, the hydrogenated styrene-butadiene copolymer (B) is compounded in an amount of 10-200 parts by mass, preferably 20-100 parts by mass based on 100 parts by mass of the aromatic vinyl compound-conjugated diene compound copolymer (A). When the amount of the copolymer (B) compounded based on 100 parts by mass of the copolymer (A) is less than 10 parts by mass, the steering stability and wear resistance of the tire can not be sufficiently improved, while when it exceeds 200 parts by mass, the Mooney viscosity of the rubber composition is too low and the productivity becomes poor.

The aromatic vinyl compound-conjugated diene compound copolymer (A) is obtained, for example, by copolymerizing the above aromatic vinyl compound and conjugated diene compound in a hydrocarbon solvent in the presence of ether or a tertiary amine with a lithium-based polymerization initiator through an anion polymerization. The hydrocarbon solvent is not particularly limited, but includes alicyclic hydrocarbons such as cyclohexane, methylcyclopentane, cyclooctane and the like; aliphatic hydrocarbons such as propane, butane, pentane, hexane, heptane, octane, decane and the like; and aromatic hydrocarbons such as benzene, toluene, ethylbenzene and the like. These hydrocarbons may be used alone or in a combination of two or more. Among these hydrocarbons, the aliphatic hydrocarbon and the alicyclic hydrocarbon are preferable.

As the lithium-based polymerization initiator, an organolithium compound is preferable. As the organolithium compound, an alkyllithium such as ethyllithium, propyllithium, n-butyllithium, sec-butyllithium, t-butyllithium or the like; an aryllithium such as phenyllithium, tolyllithium or the like; an alkenyllithium such as vinyllithium, propenyllithium or the like; an alkylene dilithium such as tetramethylene dilithium, pentamethylene dilithium, hexamethylene dilithium, decamethylene dilithium or the like; an arylene dilithium such as 1,3-dilithiobenzene, 1,4-dilithiobenzene or the like; 1,3,5-trilithiocyclohexane, 1,2,5-trilithionaphthalene, 1,3,5,8-tetralithiodecane, 1,2,3,5-tetralithio-4-hexyl-anthracene and so on are mentioned. Among them, n-butyllithium, sec-butyllithium, t-butyllithium and tetramethylene dilithium are preferable, and n-butyllithium is particularly preferable. The amount of the lithium-based polymerization initiator used is determined in accordance with the polymerization rate in the reaction operation and the molecular weight of the copolymer to be produced, and is usually within a range of 0.02-5 mg, preferably 0.05-2 mg as a lithium atom per 100 g of the monomer.

The polymerization reaction for the formation of the aromatic vinyl compound-conjugated diene compound copolymer (A) may be carried out by either of a batch polymerization system and a continuous polymerization system. In the polymerization reaction, the polymerization temperature is preferably in a range of 0-130° C. Also, the polymerization reaction may be conducted by any one of isothermic polymerization, temperature-rising polymerization and adiabatic polymerization. In the polymerization, an allene compound such as 1,2-butadiene or the like may be added for preventing the formation of a gel in a reaction vessel.

On the other hand, the hydrogenated styrene-butadiene copolymer (B) is obtained by using styrene and 1,3-butadiene as a starting material and hydrogenating a styrene-butadiene copolymer synthesized in the same manner as in the copolymer (A) in the presence of a hydrogenation catalyst according to a usual manner. That is, it is obtained by hydrogenating the synthesized styrene-butadiene copolymer under a pressurized hydrogen of 1-100 atmospheric pressure with a catalyst selected from a hydrogenation catalyst such as organonickel carboxylate, organocobalt carboxylate or organometallic compound of Group 1-3; a catalyst of metallic nickel, platinum, palladium, ruthenium or rhodium carried on carbon, silica, diatomaceous earth or the like; and a complex of cobalt, nickel, rhodium, ruthenium or the like.

The rubber composition of the invention is preferably compounded with a reinforcing filler. The filler is not particularly limited, but silica and/or carbon black is preferable.

The silica is not particularly limited, but includes, for example, wet silica (silicic hydrate), dry silica (anhydrous silicic acid), calcium silicate, aluminum silicate and the like. Among them, wet silica is preferable in a point that the effect of improving the fracture properties and the effect of simultaneously establishing the wet gripping property and the low rolling resistance are excellent. Moreover, only silica may be compounded as a filler in the rubber composition of the invention. In this case, the amount of silica compounded is 10-250 parts by mass based on 100 parts by mass of the rubber component, and is preferable to be 20-150 parts by mass from a viewpoint of the reinforcing property and the effect of improving the properties. When the amount of silica is less than 10 parts by mass based on 100 parts by mass of the rubber component, the fracture properties and the like are insufficient, while when it exceeds 250 parts by mass, the processability of the rubber composition lowers.

In case of using silica as a filler in the rubber composition of the invention, it is preferable to simultaneously add a silane coupling agent in the compounding of silica for further improving the reinforcing property. As the silane coupling agent, bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysiylpropyl-N,N-dimethylthiocarbamoyl tetrasulfide, 3-triethoxysilylpropyl-N,N-dimethylthiocarbamoyl tetrasulfide, 2-triethoxysiylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxy methylsilane, dimethoxymethylsilylpropyl-N,N-dimethylthiocarbamoyl tetrasulfide, dimethoxymethylsilylpropyl benzothiazole tetrasulfide and the like are mentioned. Among them, bis(3-triethoxysilylpropyl) tetrasulfide and 3-trimethoxysilylpropyl benzothiazole tetrasulfide are preferable from a viewpoint of the effect of improving the reinforcing property. These silane coupling agents may be used alone or in a combination of two or more.

On the other hand, the carbon black is not particularly limited, and includes grades of FEF, SRF, HAF, ISAF, SAF and the like. Also, the carbon black is preferable to have an iodine adsorption (IA) of not less than 60 mg/g and a dibutyl phthalate (DBP) absorption of not less than 80 mL/100 g. By compounding the carbon black can be improved the various properties of the rubber composition. In view of the improvement of the wear resistance, the grades of HAF, ISAF and SAF are further preferable. Moreover, only the carbon black may be compounded as a filler in the rubber composition of the invention. In this case, the amount of carbon black compounded is 10-250 parts by mass based on 100 parts by mass of the rubber component, and is preferable to be 20-150 parts by mass from a viewpoint of the efficiency of improving the reinforcing property and various properties. When the amount of carbon black is less than 10 parts by mass based on 100 parts by mass of the rubber component, the fracture properties and the like are insufficient, while when it exceeds 250 parts by mass, the processability of the rubber composition lowers.

In the rubber composition of the invention a general crosslinking system for rubber can be used. It is preferable to use a combination of a crosslinking agent and a vulcanization accelerator. As the crosslinking agent sulfur and the like are mentioned. The amount of the crosslinking agent used is preferably 0.1-10 parts by mass, more preferably 1-5 parts by mass as a sulfur content based on 100 parts by mass of the rubber component. When the amount of the crosslinking agent is less than 0.1 part by mass as a sulfur content based on 100 parts by mass of the rubber component, the breaking strength, wear resistance and low heat buildup of the vulcanized rubber lower, while when it exceeds 10 parts by mass, the rubbery elasticity is lost.

On the other hand, the vulcanization accelerator is not particularly limited, and includes thiazole type vulcanization accelerators such as 2-mercaptobenzothiazole (M), dibenzothiazyl sulfide (DM), N-cyclohexyl-2-benzothiazyl sulfenamide (CZ), N-t-butyl-2-benzothiazolyl sulfenamide (NS) and the like; and guanidine type vulcanization accelerators such as diphenyl guanidine (DPG) and the like. The amount of the vulcanization accelerator used is preferably 0.1-5 parts by mass, more preferably 0.2-3 parts by mass based on 100 parts by mass of the rubber component. These vulcanization accelerators may be used alone or in a combination of two or more.

In the rubber composition of the invention, a process oil or the like can be used as a softening agent. As the process oil paraffinic oil, naphthenic oil, aromatic oil and the like are mentioned. Among them, the aromatic oil is preferable from a viewpoint of the tensile strength and wear resistance, and the naphthenic oil and paraffinic oil are preferable from a viewpoint of the hysteresis loss and low temperature properties. The amount of the process oil used is preferably 0-100 parts by mass based on 100 parts by mass of the rubber component. When the amount of the process oil exceeds 100 parts by mass based on 100 parts by mass of the rubber component, there is a tendency of deteriorating the tensile strength and low heat buildup of the vulcanized rubber.

In the rubber composition of the invention, additives usually used in the rubber industry such as antioxidant, zinc oxide, stearic acid, antiozonant and the like may be properly selected and compounded within a scope of the invention in addition to the above rubber component, filler, silane coupling agent, crosslinking agent, vulcanization accelerator and softening agent.

The rubber composition of the invention is obtained by milling through a milling machine such as rolls, internal mixer or the like, and shaped and vulcanized, which can be used in not only tire applications such as tread rubber, undertread, carcass, sidewall, bead and the like but also other applications such as rubber vibration isolator, belt, hose and other industrial goods. Particularly, it is suitable as a tread rubber of a tire.

The pneumatic tire according to the invention is characterized by using the above rubber composition as a tread rubber. This tire has sufficient fracture properties and excellent steering stability and wear resistance because the aforementioned rubber composition having a high hysteresis loss (tan δ), a good wear resistance and sufficient fracture properties is applied to the tread rubber. Moreover, the tire of the invention is not particularly limited except that the above rubber composition is used in the tread rubber, and can be produced according to the usual manner. Also, as a gas filled in the tire usual air or air having an adjusted oxygen partial pressure but also an inert gas such as nitrogen, argon, helium or the like can be used.

The following examples are given in illustration of the invention and are not intended as limitations thereof.

Copolymers (B-1)-(B-4) are synthesized by the following method, and the bound styrene content, vinyl bond content, polystyrene-conversion average molecular weight and hydrogenation ratio of the resulting copolymers are measured by the following methods.

(1) Bound Styrene Content

The bound styrene content of the synthesized copolymer is calculated from an integral ratio of $^1$H-NMR spectrum.

(2) Vinyl Bond Content

The vinyl bond content in butadiene portion of the synthesized copolymer is analyzed by an infrared spectroscopy.

(3) Polystyrene-Conversion Average Molecular Weight (Mw)

The polystyrene-conversion average molecular weight of the synthesized copolymer is measured by GPC. In this case, GPC is a 244 Model GCP made by Waters Corporation, and a detector is a differential refractometer, and a column is GMH-3, GMH-6 and G6000H-6 made by Toso Co., Ltd. and tetrahydrofuran is used as a mobile phase. Also, a monodisperse styrene polymer made by Waters Corporation is used as a standard substance. A relation between a molecular weight of a peak of the monodisperse styrene polymer through GPC and count number of GPC is previously measured to prepare a calibration curve to thereby determine the molecular weight converted into polystyrene of the copolymer (B).

(4) Hydrogenation Ratio

The hydrogenation ratio in butadiene portion of the synthesize copolymer is calculated from a decrease of $^1$H-NMR spectrum in unsaturated bond part at 100 MHz measured at a concentration of 15% by mass using carbon tetrachloride as a solvent.

Synthesis of Copolymer B-1>

Into an autoclave of 5 liters sufficiently purged with nitrogen and provided with stirring blades are charged 3000 g of cyclohexane, 12 g of tetrahydrofuran (THF), 180 g of 1,3-butadiene and 120 g of styrene, and a temperature inside the autoclave is adjusted to 21° C. Then, 1.50 g of n-butyllithium is added to conduct polymerization under a temperature-rising condition for 60 minutes. After the conversion of the monomers is confirmed to be 99%, 4.68 g of tributylsilyl chloride is added to stop the polymerization, and then a catalyst solution of nickel naphthenate:triethyl aluminum:butadiedne=1:3:3 (molar ratio) previously prepared in another vessel is added at a ratio of 1 mol of nickel per 1000 mol of butadiene portion of the copolymer. Thereafter, hydrogen is introduced into the reaction system under a hydrogen pressure of 30 atm to conduct the reaction at 80° C. The analytical values are shown in Table 1.

<Synthesis of Copolymers (B-2)-(B-4)>

Copolymers (B-2)-(B-4) are synthesized in the same manner as in the copolymer (B-1) except that the charging ratio of monomers, amount of catalyst, hydrogen pressure and the like are changed. The analytical values are shown in Table 1.

TABLE 1

| Copolymer (B) | Bound styrene content (mass %) | Vinyl bond content (%) | Weight average molecular weight | Hydrogenation ratio (%) |
|---|---|---|---|---|
| (B-1) | 40 | 40 | $15 \times 10^3$ | 30 |
| (B-2) | 25 | 60 | $10 \times 10^3$ | 45 |
| (B-3) | 40 | 40 | $15 \times 10^3$ | 0 |
| (B-4) | 40 | 40 | $15 \times 10^3$ | 85 |

Then, each of the copolymers (B-1)-(B-4) is used to prepare a rubber composition having a compounding recipe shown in Table 2 according to the usual manner, and the fracture resistance, steering stability and wear resistance of the resulting rubber composition are evaluated by the following methods. The results are shown in Tables 3 and 4.

(5) Fracture Resistance

A tensile test is carried out according to JIS K6301-1995 to measure a tensile strength (Tb) of a vulcanized rubber composition, which is represented by an index on the basis that Comparative Example 1 is 100 in Table 3 and Comparative Example 5 is 100 in Table 4, respectively. The larger the index value, the better the fracture resistance.

(6) Steering Stability

By using a mechanical spectrometer made by Rheometrics Corporation is measured tan δ at a shearing strain of 5%, a temperature of 60° C. and a frequency of 15 Hz, which is represented by an index on the basis that Comparative Example 1 is 100 in Table 3 and Comparative Example 5 is 100 in Table 4, respectively. The larger the index value, the larger the hysteresis loss and the better the steering stability.

(7) Wear Resistance

A worn amount is measured at room temperature and a slip ratio of 60% by using a Lambourn abrasion tester, which is represented by an index on the basis that Comparative Example 1 is 100 in Table 3 and Comparative Example 5 is 100 in Table 4, respectively. The larger the index value, the smaller the worn amount and the better the wear resistance.

TABLE 2

|  | Compounding amount (part by mass) |
|---|---|
| SBR *1 | 100 |
| Carbon black *2 | 65 |
| Stearic acid | 2 |
| Zinc oxide | 3 |
| Antioxidant *3 | 1 |
| Vulcanization accelerator D *4 | 0.4 |
| Vulcanization accelerator NS *5 | 1 |
| Sulfur | 1.75 |
| Additive *6 | 30 |

*1: SBR(A) [made by JSR Corporation, SBR 1500, bound styrene content = 23.5 mass %, vinyl bond content = 18%, polystyrene-conversion average molecular weight = $450 \times 10^3$] or SBR(B) [SBR synthesized by solution polymerization, bound styrene content = 38 mass %, vinyl bond content = 35%, polystyrene-conversion average molecular weight = $400 \times 10^3$] is used. The kind of SBR used is shown in Tables 3 and 4.
*2: ISAF, made by Tokai Carbon Co., Ltd. Seast 3H
*3: N-(1,3-dimethylbutyl)-N'-phenyl-p-phenylene diamine, made by Ouchi Shinko Kagaku Kogyo Co., Ltd. "Noclac 6C"
*4: 1,3-diphenyl guanidine, made by Ouchi Shinko Kagaku Kogyo Co., Ltd. "Nocceler D"
*5: N-t-butyl-2-benzothiazolyl sulfenamide, made by Ouchi Shinko Kagaku Kogyo Co., Ltd. "Nocceler NS"
*6: The kind of additives used is shown in Tables 3 and 4.

TABLE 3

|  |  | Comparative Example 1 | Comparative Example 2 | Comparative Example 3 | Comparative Example 4 | Example 1 | Example 2 |
|---|---|---|---|---|---|---|---|
| SBR used *1 |  | — | SBR(A) | SBR(A) | SBR(A) | SBR(A) | SBR(A) |
| Additive used *6 |  | — | none | aromatic oil | copolymer (B-3) | copolymer (B-4) | copolymer (B-1) | copolymer (B-2) |
| Fracture resistance | index | 100 | 85 | 101 | 90 | 100 | 104 |
| Steering stability | index | 100 | 110 | 118 | 128 | 127 | 130 |
| Wear resistance | index | 100 | 80 | 102 | 98 | 105 | 107 |

TABLE 4

|  |  | Comparative Example 5 | Comparative Example 6 | Comparative Example 7 | Comparative Example 8 | Example 3 | Example 4 |
|---|---|---|---|---|---|---|---|
| SBR used *1 |  | SBR(B) | SBR(B) | SBR(B) | SBR(B) | SBR(B) | SBR(B) |
| Additive used *6 |  | none | aromatic oil | copolymer (B-3) | copolymer (B-4) | copolymer (B-1) | copolymer (B-2) |
| Fracture resistance | index | 100 | 90 | 110 | 87 | 110 | 107 |
| Steering stability | index | 100 | 107 | 112 | 124 | 125 | 128 |
| Wear resistance | index | 100 | 93 | 107 | 90 | 108 | 105 |

As seen from the results of Tables 3 and 4, the steering stability and wear resistance can be improved without damaging the fracture resistance of the rubber composition by compounding the hydrogenated styrene-butadiene copolymer (B) having the molecular weight and bound styrene content defined in the invention and a hydrogenation ratio of double bond in butadiene portion of 25-50%.

As seen from the results of Comparative Examples 2 and 6, the addition of the aromatic oil can improve the steering stability of the rubber composition, but largely lowers the fracture resistance and wear resistance. Also, as seen from the results of Comparative Examples 3 and 7, when the styrene-butadiene copolymer satisfying the molecular weight and bound styrene content defined in the invention but being not hydrogenated in butadiene portion is used, the steering stability of the rubber composition can be improved, but the improving width of the steering stability is considerably lower than that of the examples. Further, as seen from the results of Comparative Examples 4 and 8, when the hydrogenated styrene-butadiene copolymer satisfying the molecular weight and bound styrene content but having an extremely high hydrogenation ratio of double bond in butadiene portion is used, the compatibility between matrix rubber and hydrogenated SBR is poor and the fracture resistance and wear resistance of the rubber composition are deteriorated.

What is claimed is:

1. A rubber composition comprising as a rubber component (A) an aromatic vinyl compound-conjugated diene compound copolymer polymerized with a lithium-based polymerization initiator and having a polystyrene-conversion weight average molecular weight of $3.0 \times 10^5$–$3.0 \times 10^6$ as measured by a gel permeation chromatography and (B) 10-200 parts by mass, based on 100 parts by mass of the copolymer (A), of a hydrogenated styrene-butadiene copolymer having a polystyrene-conversion weight average molecular weight of $5.0 \times 10^3$–$2.0 \times 10^5$ as measured by a gel permeation chromatography and a bound styrene content of 10-70 mass % in which 25-50% of double bonds in butadiene portion is hydrogenated.

2. A rubber composition according to claim 1, wherein the aromatic vinyl compound-conjugated diene compound copolymer (A) is a styrene-butadiene copolymer.

3. A rubber composition according to claim 2, wherein the bound styrene content of the aromatic vinyl compound-conjugated diene compound copolymer (A) is 20-40 mass %.

4. A rubber composition according to claim 2, wherein the vinyl bond content in the butadiene portion of the aromatic vinyl compound-conjugated diene compound copolymer (A) is 30-60%.

5. A rubber composition according to claim 1, wherein 35-50% of double bonds in the butadiene portion of the hydrogenated styrene-butadiene copolymer (B) is hydrogenated.

6. A rubber composition according to claim 1, wherein the bound styrene content of the hydrogenated styrene-butadiene copolymer (B) is 10-60 mass %.

7. A rubber composition according to claim 1, wherein the hydrogenated styrene-butadiene copolymer (B) is compounded in an amount of 20-100 parts by mass based on 100 parts by mass of the aromatic vinyl compound-conjugated diene compound copolymer (A).

8. A pneumatic tire characterized by using as a tread rubber a rubber composition as claimed in any one of claims 1 to 7.

* * * * *